United States Patent [19]

Knisley

[11] Patent Number: 5,338,047
[45] Date of Patent: Aug. 16, 1994

[54] TRAILER ALIGNMENT DEVICE

[76] Inventor: Glenn E. Knisley, 8596 Oak View La., Fair Oaks, Calif. 95628

[21] Appl. No.: 916,605

[22] Filed: Jul. 22, 1992

[51] Int. Cl.⁵ .............................................. B60S 11/00
[52] U.S. Cl. ....................................... 280/3; 180/904; 280/475; 280/DIG. 11
[58] Field of Search ................ 280/3, 475, 477, 478.1, 280/479.1, 764.1, 766, DIG. 11, 763.1; 180/904

[56] References Cited

U.S. PATENT DOCUMENTS

4,470,564  9/1984  Johnson ............................. 180/904

Primary Examiner—Mitchell J. Hill
Attorney, Agent, or Firm—Mark C. Jacobs

[57] ABSTRACT

A device simply the alignment of a trailer tongue of a towed vehicle for coupling to the tow bar of a towing vehicle. The device includes a direction orientable wheeled body having a socket thereon to receive the lower end of a vertical tongue jack of the trailer whereby movement of the wheel of the device aligns the trailer tongue hitch socket with the hitch ball of a towing vehicle. Wheel movement is achieved by rotation of a gear in engagement with the wheel.

15 Claims, 6 Drawing Sheets

TRAILER ALIGNMENT DEVICE

BACKGROUND OF THE INVENTION

The use of travel trailers and boat trailers by today's recreation oriented society is well documented. As boats get bigger, their trailers get longer. As travel trailers become more sophisticated to provide space for showers, refrigerators, TV sets and other comfort providing appliances and facilities, the trailers have themselves become bigger and bulkier.

It is quite common to park the boat trailer in a garage separate from the car or truck. And, it is quite common to park the camping trailer in a campground and detach the towing vehicle to use it for local touring and shopping.

Today most towed vehicles are retained by a ball and socket towing apparatus made by one manufacturer or another. Unfortunately, most people have difficulty in backing up the towing vehicle to the exact spot where the hitch ball would be in alignment with the socket of the trailer or towed vehicle to permit ready coupling of one to the other. The problem is compounded by the fact that the weight of the trailer tongue inhibits manual alignment of the socket with the previously positioned ball of the towing vehicle. This necessitates repeated back-up efforts, often resulting in frustration for both the driver of the towing vehicle and the helper directing the driver's movements.

Various devices have been invented to help align the trailer tongue's socket with the towing vehicle's ball for this coupling.

Many of these however, are limited in their movement capabilities. Some utilize a track, others only move in one direction. Some have constructions that do not lend themselves for use on other than flat land. As the result of a patent search applicant became aware of the following U.S. Pat. Nos.:

| 1,337,065 | GARCIA |
| 3,084,953 | MCGREGOR |
| 3,765,703 | VOELKERDING |
| 4,911,460 | DEPAULA |
| 4,961,589 | FAURENHOFF |

Yet with all of these inventions and others, there still remains the need for an easy-to-use, low-cost readily-manipulatable trailer tongue alignment device.

It is an object therefore of this invention to provide an improved trailer tongue alignment device, operable by a socket wrench.

It is another object to provide a trailer tongue alignment device which can be easily operated by man, woman and child.

Still another object is provide a trailer tongue alignment device that is moveable in 360° as may be needed.

A further object is to provide a tongue alignment device that is usable with almost any trailer tongue which has a vertical trailer tongue jack.

A still further object is to provide a trailer tongue alignment device that can be operated on soft or hard ground, paved or pebbled surfaces, be they flat or sloping.

These and other objects of the invention will in part be obvious and will in part appear hereinafter.

The invention accordingly comprises the product possessing the features, properties and the relation of components which are exemplified in the following detailed disclosure and the scope of the application of which will be indicated in the claims.

For a fuller understanding of the nature and objects of the invention reference should be made to the following detailed description taken in conjunction with the accompanying drawings.

SUMMARY OF THE INVENTION

A device to simplify the alignment of a trailer tongue of a towed vehicle for coupling to the tow bar of a towing vehicle. The device includes a direction orientable wheeled body having a receiver thereon to receive the lower end of a vertical tongue jack of the trailer whereby movement of the wheel of the device by an operating tool both rotationally and linearly aligns the trailer tongue with the hitch of a towing vehicle for coupling of one to the other.

DESCRIPTION OF THE PREFERRED EMBODIMENT

Figure 1:
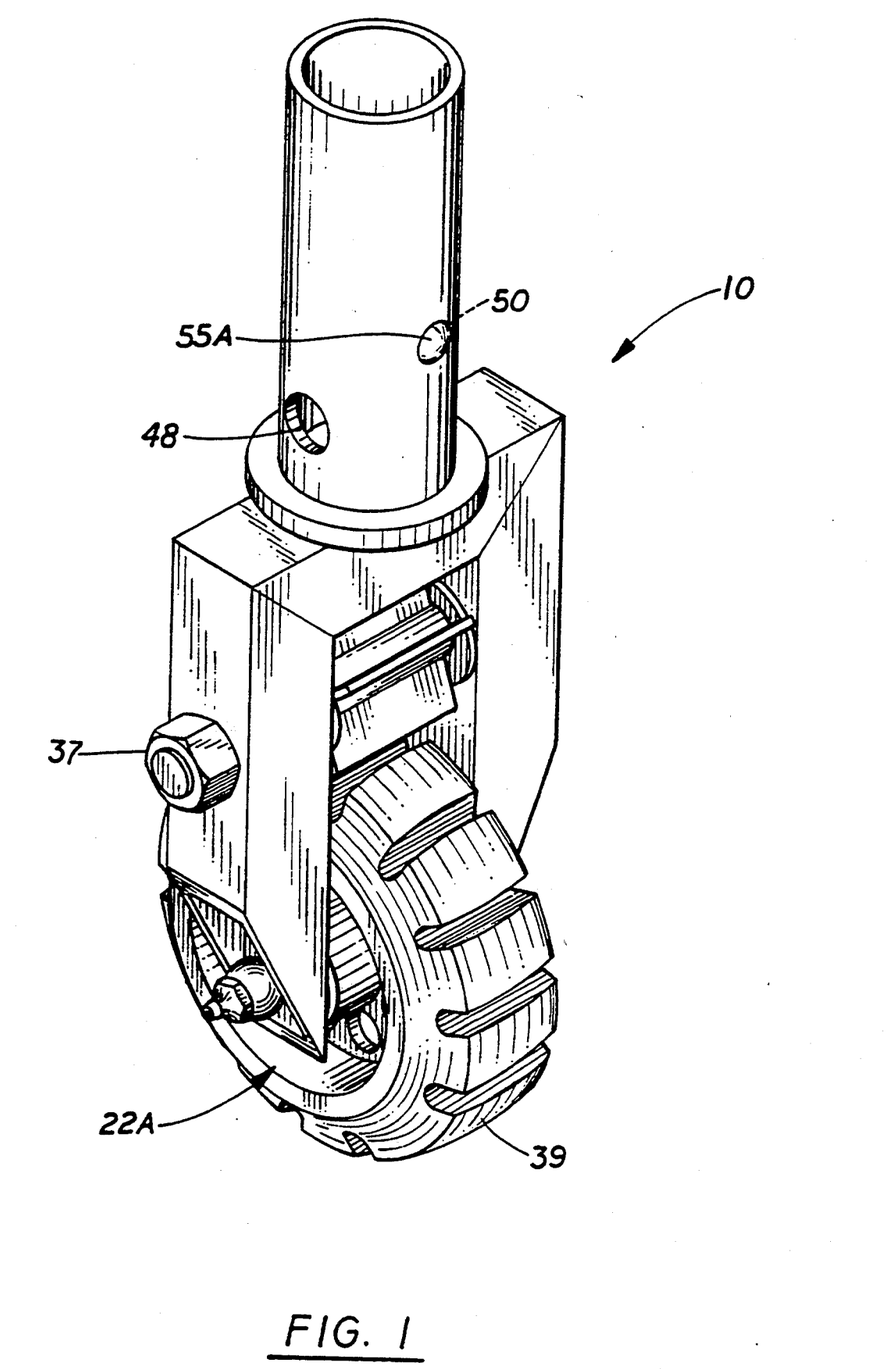
FIG. 1 is a front perspective view of the device of this invention.

The invention seen in FIG. 1, is best described by reference to FIG. 2. Device 10 is comprised of a housing 11 formed from a body 12, having a trio of square tubing members upon which is mounted a tubular receiver 47. The body 12 includes a left square tubing member 13, a right such member 17 and a top member 15 also of the same square tubing interposed to form an inverted U-shaped assemblage. The junctions of tubular sections 13 to 15 and 17 to 15 are preferably along mitered edges 16A and 16B at 45° angles rather than at hard right angles. These junctions may be made by welding, brazing, adhesing or the like. Body 12 could also be cast or molded as an integral unit.

Tube 13 has a cutaway portion missing along chamfered edge 18, while tube (tubular member) 17 has a mirror image cutaway portion along chamfered edge 20. The inward facing surfaces of the tubular members are designated 13-I and 17-I respectively. Each inner face or surface 13-I and 17-I has a through bore 30, 32 respectively which are aligned to receive pin 19.

Figures 3, 4:
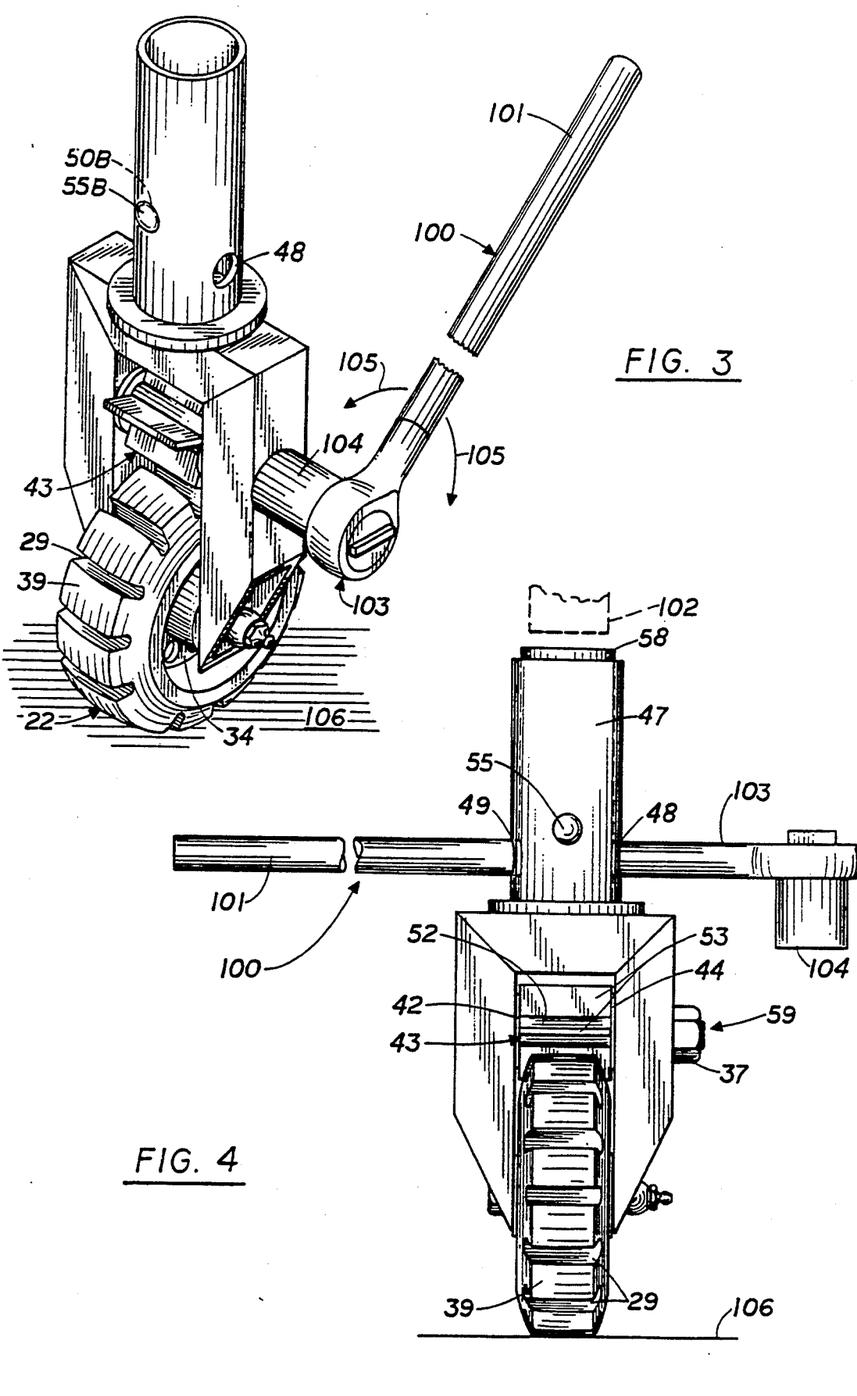
FIG. 3 is a right rear perspective view of the device of this invention showing the operating tool engaged thereto for orientation movement.
FIG. 4 is a rear elevational view of the device of this invention showing the operating tool in position for rotational movement.
Figure 8:
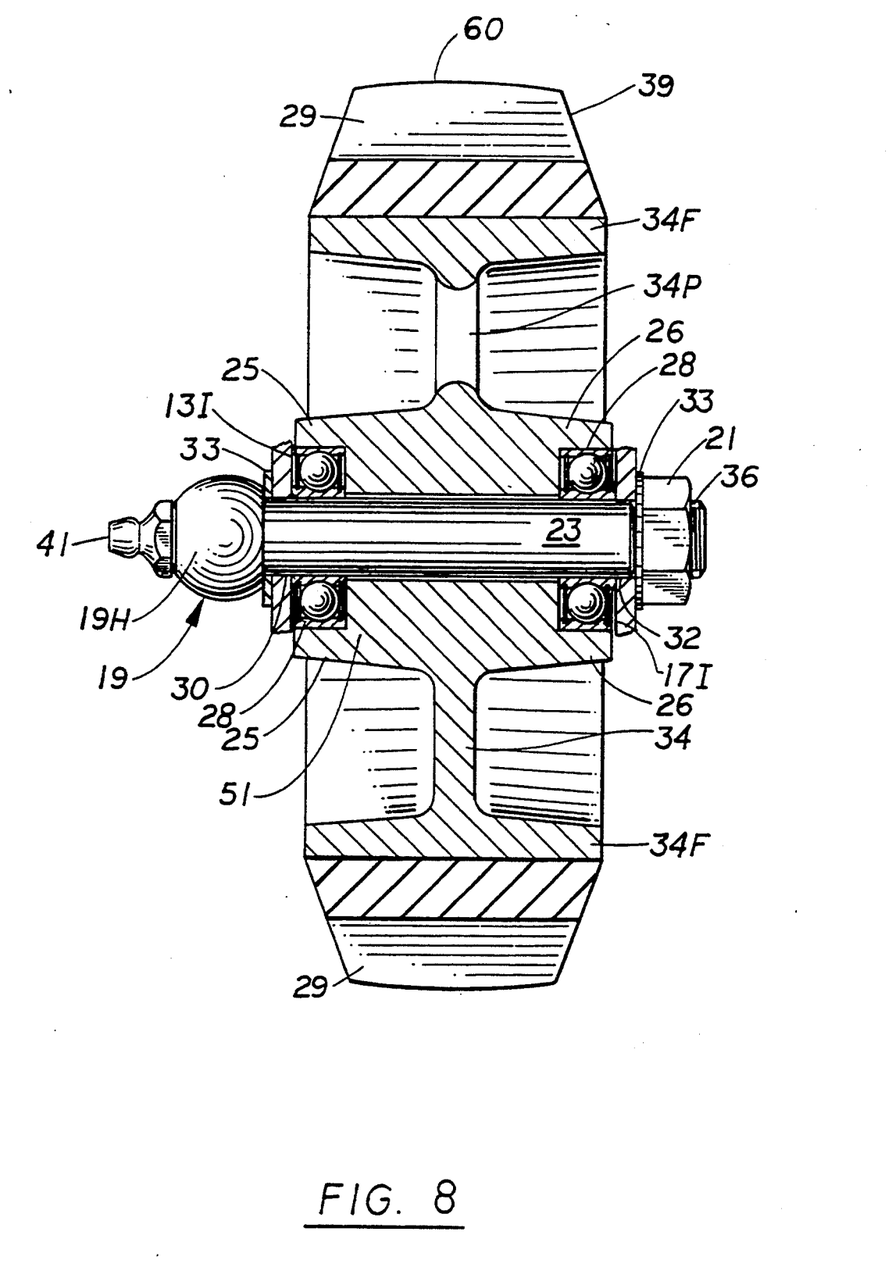
FIG. 8 is a sectional view illustrating the details in the mounting of the wheel to the main body.

Reference should now be made to FIG. 8 for the details of the mounting of the wheel 22. The wheel 22 comprises a wheel mounting means 22A, composed of a wheel plate 34, which may optionally include a circumscribing series of weight reducing apertures 34P as shown, and a normally disposed circular flange 34F, all of which are best seen in FIG. 3, plus a tire 39 mounted on the wheel mounting means. From the plate 34, emanate two similar hub portions 25, 26, one on each of the opposite sides of the center plate 34, as per FIG. 8. A throughbore 51 passes laterally through the two hub portions 25, 26 and the plate 34. Disposed in said throughbore is a conventional roller bearing 28.

An axle 23 configured from a pin 19, having a head 19H, has a threaded portion 36 upon which is threadingly engaged a nut 35, and a spacer washer 33. This pin 19 passes through the walls 17I and 13I via holes 32 and 30 respectively and the ball bearings 28 as is shown. Spacer washers 33 are mounted on said pin adjacent walls 13I and 17I. A nut 21 secures the pin in place. A grease fitting on head 19H serves to lubricate the bearings as is well known in the art.

Figure 2:
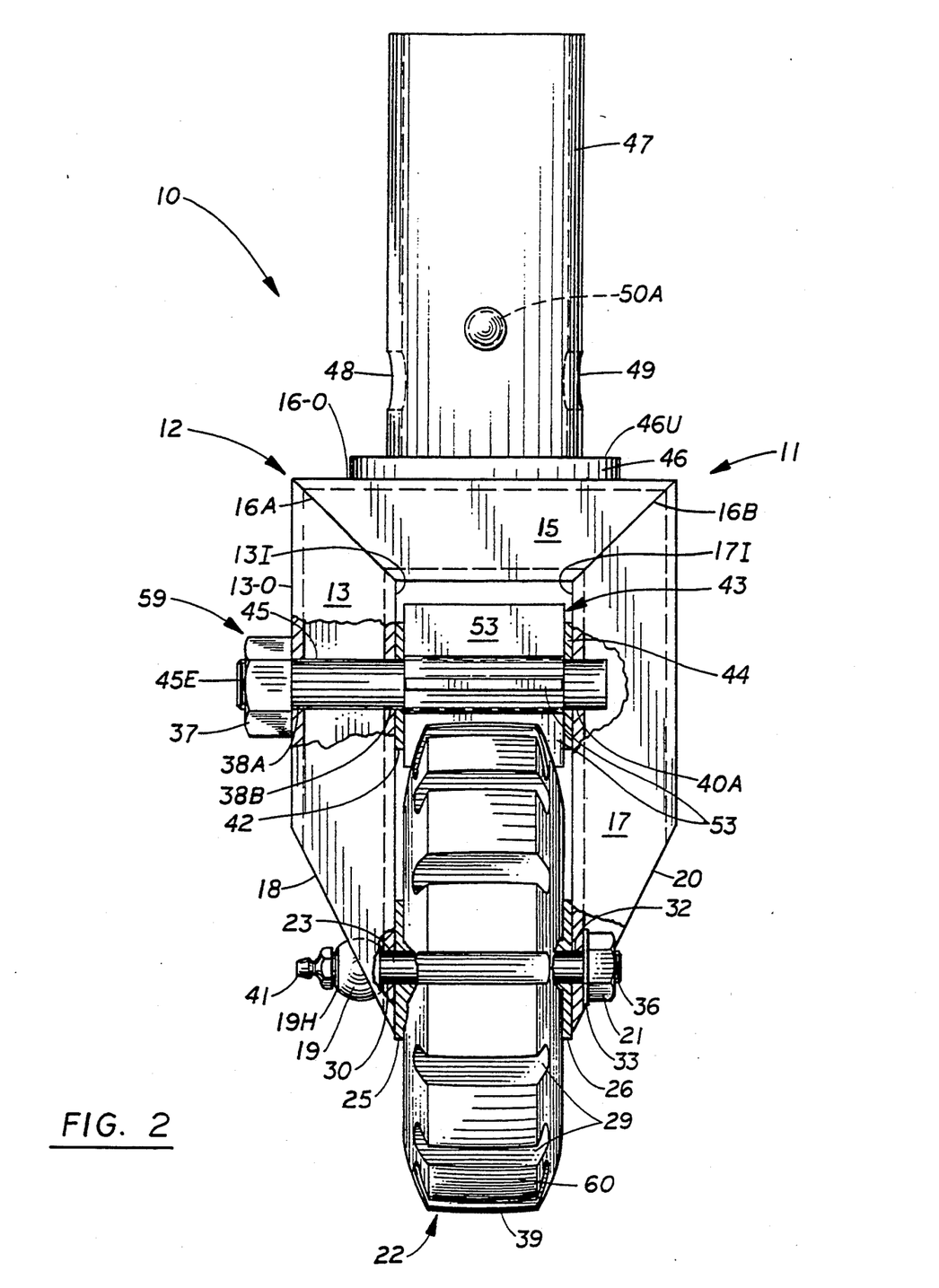
FIG. 2 is a detailed closeup front elevational view of the device of FIG. 1.

While the inward facing wall of tubular member 13 has been designated 13I, the outward facing surface is seen to be designated 13-0, per FIG. 2. Spaced down at about the midpoint of wall surface 13-0 is an aperture 38A. Horizontally aligned therewith in wall surface 13I is another aperture 38B. Also aligned horizontally with said apertures is a third aperture 40A in wall surface 17I. A shaft 45 extends from beyond the aperture 38A through the square tubing 13 into square tubing 17 by passing through the three apertures 38A, 38B and 40A. The section of shaft 45 which extends beyond aperture 38A, i.e., out past the square tubing 13, has a nut such as hex nut 37, designated the operating nut, fixedly secured thereto such that rotation of said hex nut 37 will rotate said shaft 45 as will be described below. The extended section 45E and the nut 37 thereupon, taken together form the actuating means 59, for rotation of the paddle wheel unit 43. The operating tool described below carries out the actual actuation.

A pair of rotatable disk spacer washers 42, 44 are disposed on said shaft adjacent the inward facing side walls, 13I and 17I. Fixedly secured on said shaft 45, as by welding or brazing is a paddle wheel unit 43. (FIG. 2 and FIG. 3) This paddle wheel unit 43 is fixedly disposed between said spacer washers 42, 44 upon said shaft 45.

Paddle wheel unit 43 includes as per FIG. 4, a central tubular section 52 mounted to shaft 45 as by welding or brazing. Disposed outwardly normal to the axis of shaft 45 at 90 degree intervals are a series of 4 plates or paddles 53. These too may be secured as by welding or brazing, assuming that the shaft 45 and the tubular section 52 are all steel.

In addition, paddle wheel unit 43 may be made as an integral unit as by casting or molding in metal or plastic. Obviously if it is made of plastic a suitable adhesive would be used to secure the paddle unit 43 to the shaft 45.

While a series of four such paddles are shown, it is obvious that since the spacing of the slots 29 in the tire 39 controls the number of paddles, an adjustment of the spacing of the slots 29 will permit the usage of more or less paddles 53 around the perimeter of tubular section 52 at different spacing angles.

Housing 11 has mounted to it on the upper surface, i.e., the outer surface 16-0, an oversize mounting disk, 46, such as of about 3.5 to 4.5 inches in diameter. This disk can be secured as by welding, brazing or adhesing of the disk to the square tubing. The term oversize is used because the typical square tubing used in this invention is 1" tubing. Therefore the disk 46 overhangs the square tubing both forwardly and rearwardly.

Mounted upon the upper surface 46U of said disk 46 is a tubular receiver 47. It is typically of metal of about 5" in elevation and of a 2" interior diameter. This receiver is adapted to receive various sleeves of reduced internal diameters, which diameters individually match the diameter of a trailer tongue jack for the particular trailer to be towed.

Figure 5:
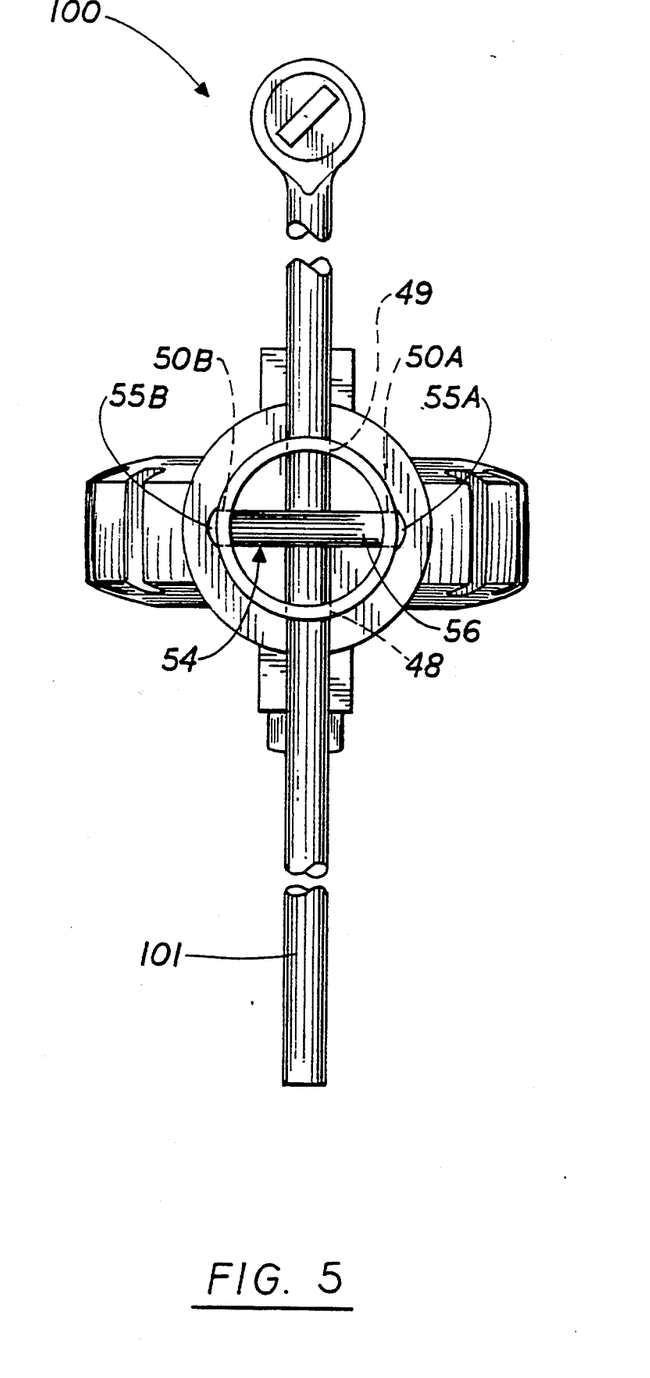
FIG. 5 is a top plan view.

Reference to FIG. 2 shows the presence of a pair of aligned throughbores 48, 49, which are preferably spaced up slightly from the bottom of the tubular receiver 47. A long shaft such as shaft 101 forming a part of the operating tool, 100, as seen in FIGS. 3, 4 and 5 is sized in cross section to fit through the aligned bores 48, 49. When the shaft 101 is so placed, tool 100 can be manually rotated to orient the tire 39 to move in a particular direction. Actual movement however, utilizing the operating tool 100 in engagement with the operating nut 37 will be described infra.

Disposed normal to said aligned bores 48, 49, and slightly above them on the elevation of the tubular receiver are a pair of aligned crosspin openings 50A, 50B, with one of them, 50A being seen in FIG. 2. A crosspin 54, having two opposed heads 55A, 55B on opposite of a presized pin shaft 56 is disposed across the interior diameter of the tubular receiver 47. See FIGS. 3, 4, and 5. This crosspin's heads 55A, 55B may be secured within the crosspin openings 50, 51 as by welding, soldering, brazing or adhesing with a suitable glue when the structure is plastic not metal.

Figure 6:
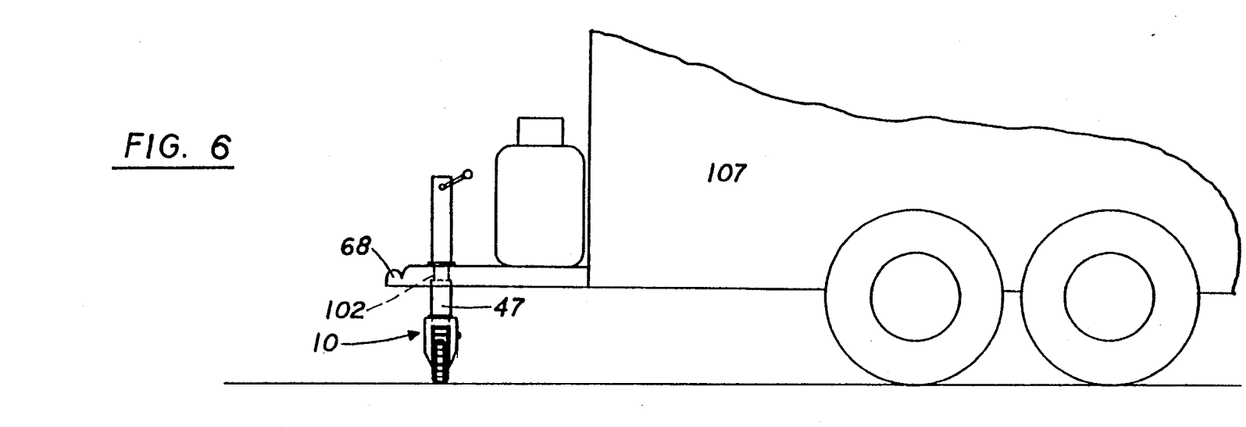
FIG. 6 is an elevational view showing the engagement of the trailer's jack with the device of this invention prior to any act of alignment.

The purpose of the crosspin 54 is form a rest for optional sleeve 58, when said sleeve is removably inserted into tubular receiver 47. Sleeve 58, seen in FIG. 4, as noted, has an exterior diameter slightly smaller than the interior of tubular receiver 47. The sleeve 58's interior diameter is intended to match the size of the tongue jack tubular support 102, if this last is of a much smaller diameter than the internal diameter of tubular receiver 47. Reference is made to FIG. 6. This sleeve 58 has an elevation of 3.5 inches or so and is preferably of an elevation such that when inserted into the tubular receiver 47, none of the sleeve 52 sticks out the top of the receiver 47.

The last portion of the device 10 to be described is the wheel assembly 22. The wheel 22 is made from several components. These include wheel plate 34, the circumscribing flange 34F, and the two opposed hub portions 25, 26 one of which is located on each side of the wheel plate 34 along its central axis. These components have been previously described with respect to FIG. 8. The wheel 22 also includes a slotted tire, which is seen in FIGS. 1, 2, and 3 among others. Tire 39, which is of about a 6" diameter includes a series of inwardly extending slots 29 of approximately 0.5 inches in depth around the periphery of the tread, 60. These slots are spaced at a distance of about 1.25" on center for use with the paddle unit 43's paddles 53. These paddles are approximately 0.5" as measured from outer edge to sleeve 52. It is within the skill of the art to use tires which have slots of different spacings and of different depths for employment with different sized and spaced paddles. The wheel unit just described, but without the tire slots is sold in the marketplace as a caster wheel for warehouse carts and other purposes.

OPERATION OF THE INVENTION

The operation of the device of this invention is best understood by reference to FIGS. 3 through 7. In FIG. 4, the shaft 101 of operating tool 100 is seen to be inserted in place through the two aligned bores 48, 49. In FIG. 5, a top plan view the shaft 101 is shown in position without the use of the optional sleeve 58. This shaft which is an extension of the arm of the socket wrench portion 103 of operating tool 100, suitably should be about 3 feet long. It acts as a lever to generally orient the device in the correct direction for movement toward the towing vehicle. This activity can not transpire, however, until such time as the device 10 has been placed in engagement with the trailer, as by a lowering of the conventional tongue jack support leg or tube 102 directly into the tubular receiver 47 or the correctly sized sleeve 58 disposed within said receiver 47.

The operation of such jacks is well understood and as such the details need not be discussed. Suffice it to say, however, that the engagement transpires by lowering the tongue jack support 102 into the tubular receiver which is manually held in place therebeneath for the minute or so required for such action.

After properly orienting device 10, the shaft 101 is removed from its position in the tubular receiver 47. The correct socket 104 is applied to the socket wrench portion 103 of tool 100. The correct socket 104, per FIG. 4, is the one which will engage the operating nut 37, seen in FIGS. 1 and 2. Movement of shaft 101 in a downward stroke as illustrated by down arrow 105 in FIG. 3, causes the shaft 45 having paddle unit 43 secured thereto to rotate forwardly such that a paddle 53 engages a slot 29 of tire 39 in a gear-like fashion whereby the tire moves forwardly a finite distance on the ground or street 106.

Figure 7:
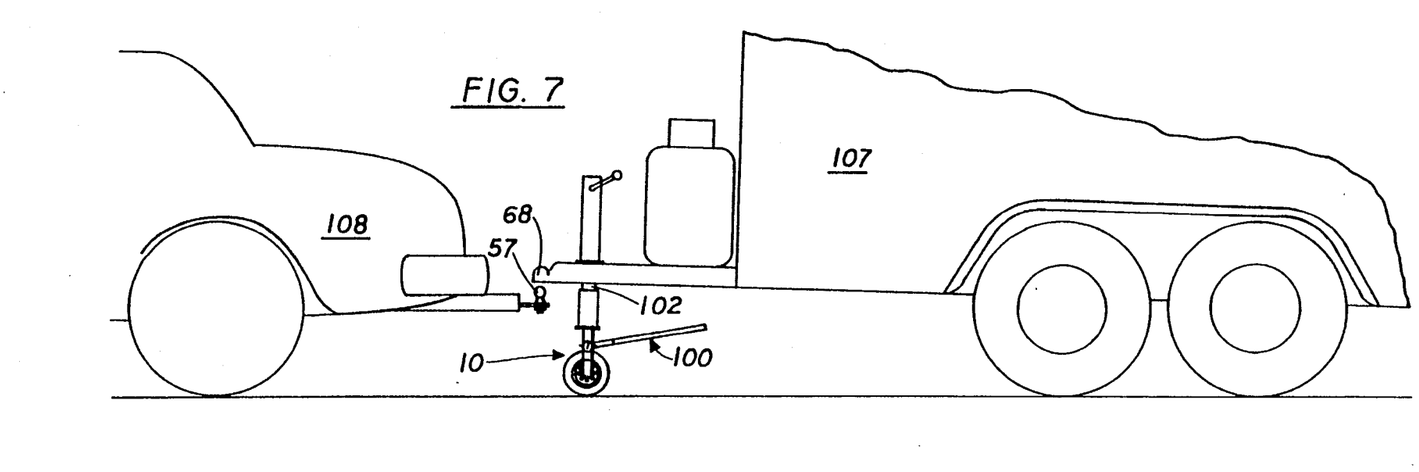
FIG. 7 is a side elevational view showing the alignment of the trailer tongue socket with the ball hitch of the towing vehicle.

Since the trailer 107 is in engagement with device 10 as discussed supra, movement of device 10 toward the towing vehicle 108 as shown in FIG. 7 takes place. Once alignment of the ball 57 and socket 68 take place, engagement in conventional fashion can transpire.

It is seen that I have described a simple to make and easy to use trailer alignment device to enhance trailer hookup. The device can be operated with a minimum of effort by persons from teenage on up with a minimum of effort.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. A device to facilitate the alignment of a trailer with a tow vehicle for engagement of the trailer hitch ball of the tow vehicle to the socket of the tongue of the trailer, which device comprises in combination:
   a. a housing having an inverted U-shaped body, having a left side member, a right side member and a top member, said left and right side members having aligned axle receiving bores therein;
   b. a wheel, comprising a wheel mounting means having a central throughbore for the receipt of an axle, and a tire disposed on said wheel mounting means, said tire having a series of spaced inward extending slots around the periphery of the tread;
   c. an axle disposed between said body's left and right members and having said wheel mounting means disposed thereon;
   d. a manually rotatable paddle wheel unit, having a series of outwardly extending paddles, rotatably mounted between the left and right members of said body, one of said paddles being engageable with one of the tire's slots at a given point in time in a gear-like manner;
   e. actuating means for rotating said paddle wheel unit extending through one of said body members, and connected to said paddle wheel unit; and
   f. a tubular receiver having a pair of linearly aligned bores therein for receipt of an orientation shaft mounted upon said top member, said tubular receiver adapted to receive a trailer tongue jack support tube,
   whereby upon rotation of the actuating means to rotate the paddle wheel unit a series of paddles engages a series of slots in said wheel causing said wheel to move in the direction it has been oriented.

2. In the device of claim 1, further including a cross pin disposed in said tubular receiver spaced upward from said pair of linearly aligned bores.

3. The device of claim 2 further including a series of varying interior diameter sleeves, each of whose exterior diameter is slightly less than the interior diameter of the said tubular receiver, each of said sleeves being adapted to individually seat within said receiver.

4. In the device of claim 1 wherein the left, right and top members of the body are all constructed of square tubes, and the left and right tubes are chamfered at their ends distant from the top member.

5. The device of claim 1 further including an operating tool comprising a conventional socket wrench having a long shaft extending from the arm of said socket wrench.

6. In the device of claim 1 wherein the paddle wheel unit has four paddles.

7. In the device of claim 1 wherein the actuating means comprises a hex nut fixedly secured to an extension of the shaft of said paddle unit, said extension passing through one of said side members.

8. In the device of claim 7 wherein the left, right and top members of the body are all constructed of square tubes and the left and right tubes are chamfered at their ends distant from the top member.

9. In the device of claim 1 wherein the axle comprises a pin surrounded by a roller bearing, said bearing being disposed between said side members.

10. In the device of claim 1 wherein the wheel comprises a tire mounted upon a flange disposed normal to a centrally bored wheel plate.

11. In the device of claim 10 wherein the wheel plate includes a series of weight reducing holes therein.

12. A device to facilitate the alignment of a trailer with a tow vehicle for engagement of the trailer hitch ball of the tow vehicle to the socket of the tongue of the trailer, which device comprises in combination:
   a. a housing having an inverted U-shaped body, having a left side member, a right side member and a top member, all of said members being constructed of square tubing, and said left and right side members having aligned axle receiving bores therein;
   b. a wheel, comprising a wheel mounting means having a central throughbore for the receipt of an axle, and a tire disposed on said wheel mounting means, said tire having a series of spaced inward extending slots around the periphery of the tread;
   c. an axle disposed between said body's left and right members and having said wheel mounting means disposed thereon;
   d. a manually rotatable paddle wheel unit, having a series of outwardly extending paddles, rotatably mounted between the left and right members of said body, one of said paddles being engageable with one of the tire's slots at a given point in time in a gear-like manner;

e. actuating means for rotating said paddle wheel unit extending through one of said body members, and connected to said paddle wheel unit; and f. a tubular receiver having a pair of linearly aligned bores therein for receipt of an orientation shaft mounted upon said top member, said tubular receiver adapted to receive a trailer tongue jack support tube, said receiver also having a cross pin disposed across the diameter thereof;

whereby upon rotation of the actuating means to rotate the paddle wheel unit a series of paddles engages a series of slots in said wheel causing said wheel to move in the direction it has been oriented.

13. In the device of claim 12 wherein the paddle unit has four outward extending paddles.

14. In the device of claim 12 wherein a plate is interposed between said tubular receiver and said top member for rigidity.

15. In the device of claim 12 wherein the axle for said wheel comprises a pin surrounded by a roller bearing.

* * * * *